United States Patent [19]
Komuro

[11] Patent Number: 5,224,159
[45] Date of Patent: Jun. 29, 1993

[54] KEY TELEPHONE SYSTEM PROVIDED WITH TELEPHONE SETS CONNECTABLE TO ADD-ON MODULES

[75] Inventor: Isaku Komuro, Kokubunji, Japan

[73] Assignee: Kabushiki Kaisha Toshiba, Kawasaki, Japan

[21] Appl. No.: 825,199

[22] Filed: Jan. 24, 1992

[30] Foreign Application Priority Data

Jan. 24, 1991 [JP] Japan .................................. 3-007184
Jan. 30, 1991 [JP] Japan .................................. 3-029376

[51] Int. Cl.⁵ ............................................ H04M 1/72
[52] U.S. Cl. ..................................... 379/165; 379/166
[58] Field of Search ................................ 379/165, 166

[56] References Cited

U.S. PATENT DOCUMENTS 4,932,043 6/1990 Nakayama et al. .................. 379/165

Primary Examiner—Stafford Schreyer
Attorney, Agent, or Firm—Foley & Lardner

[57] ABSTRACT

Disclosed is a key telephone system provided with a key service unit (KSU) 1 having a central control unit 6, and a digital key telephone set (DKT) 10 having a local control unit 13 for communications of control data with the central control unit 6. First and second add-on modules (ADMs) 24 and 34 for communications of control data with the central control unit 6 are optionally connectable to the DKT 10. When control data (up-data) are transmitted from the local control unit 13 of the DKT 10 to the KSU 1, a disable signal is given from the DKT 10 to the first ADM 24 to disable up-data from being transmitted from the first ADM 24. At this time, the first ADM 24 also outputs a disable signal to the second ADM 34 to disable up-data from being transmitted from the second ADM 34. At any selected time when no up-data are transmitted from the DKT 10, an enable signal is given from the DKT 10 to the first ADM 24. In response to this enable signal, when up-data to be transmitted from the first ADM 24 are present, the first ADM 24 transmits the up-data and further gives the disable signal to the second ADM 34 to disable up-data from being transmitted from the second ADM 34. On the other hand, in response to the enable signal from the DKT 10, when up-data to be transmitted from the first ADM 24 are absent, the first ADM 24 outputs an enable signal to the second ADM 34 to enable up-data to be transmitted from the second ADM 34.

9 Claims, 13 Drawing Sheets

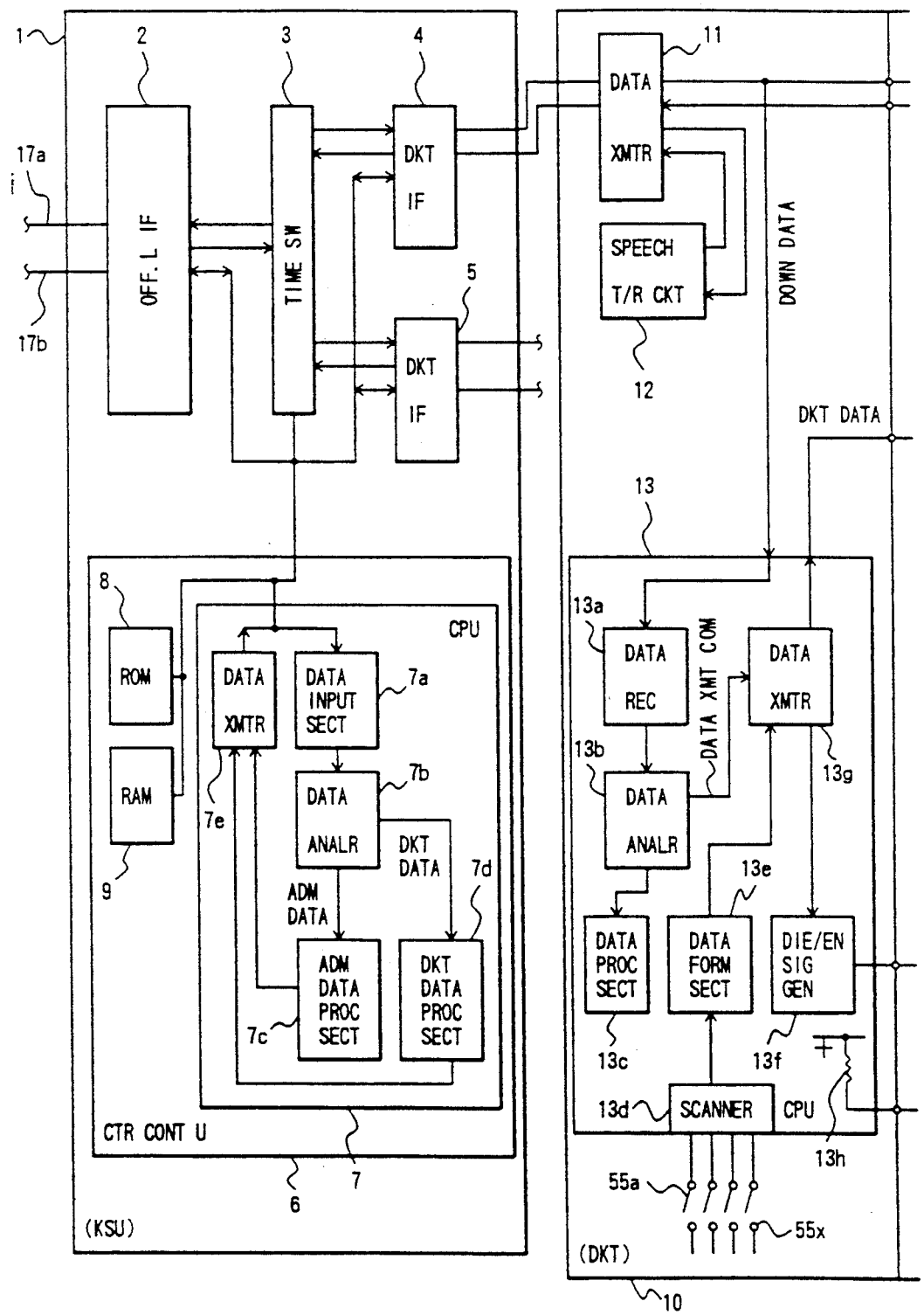
F I G. 2 (A)

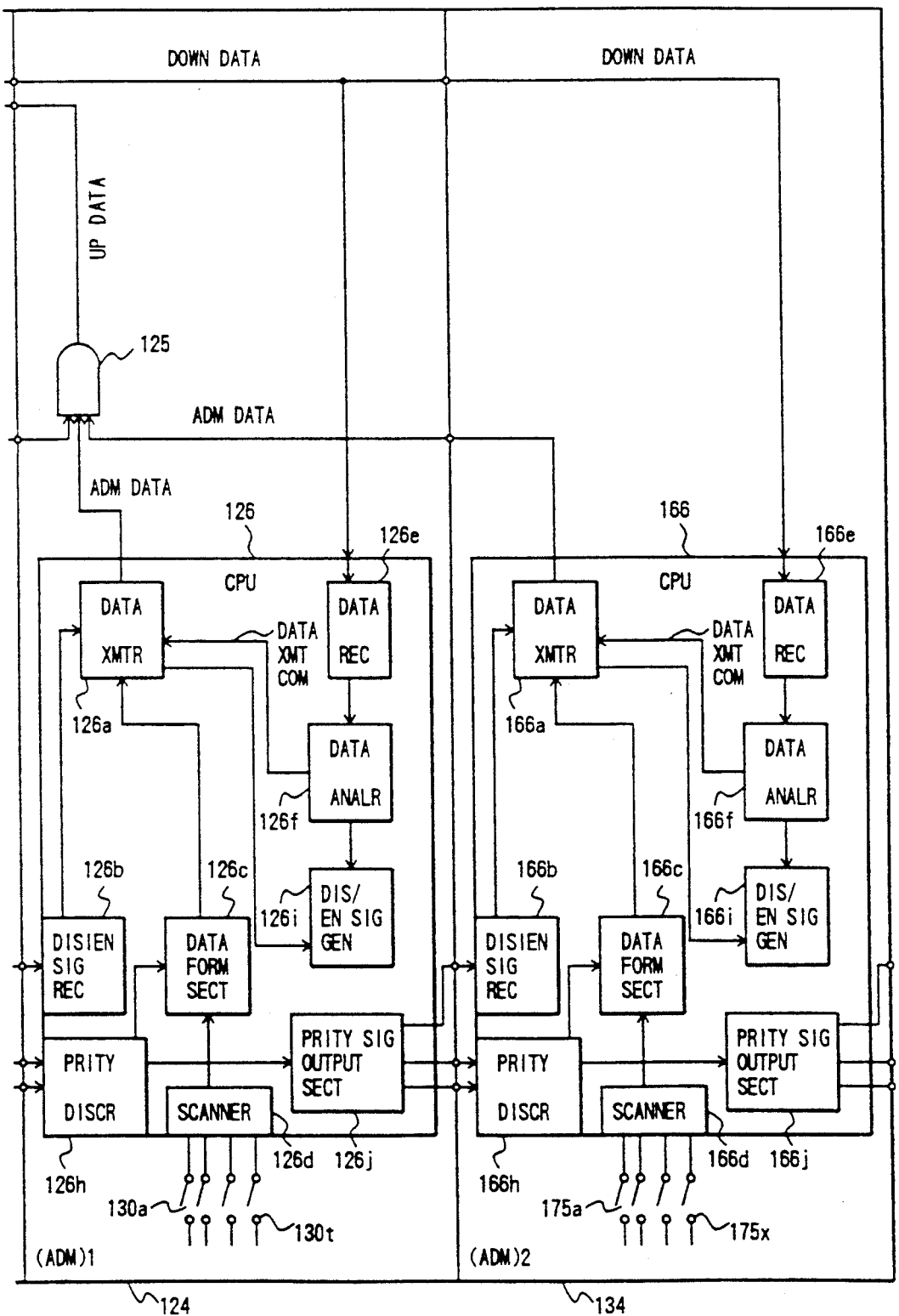
F I G. 1 0 (B)

KEY TELEPHONE SYSTEM PROVIDED WITH TELEPHONE SETS CONNECTABLE TO ADD-ON MODULES

BACKGROUND OF THE INVENTION

The present invention relates to a key telephone system, and more specifically to a key telephone system provided with digital key telephone sets connectable to add-on modules for enhancement of telephone functions.

FIG. 1 is a block diagram showing the entire system configuration of a prior-art key telephone system. The key telephone system comprises a key service unit (referred to as KSU, hereinafter) 1, and a plurality of digital key telephone sets (referred to as DKTs, hereinafter) 10 and 20, to which add-on modules (referred to as ADMs, hereinafter) are optionally connectable to enhance the functions of the DKTs.

In FIG. 1, the KSU 1 comprises an office line interface unit 2 connected to an office line 17a, 17b, and a plurality of DKT interface units 4 and 5 (only two units are shown) provided with a plurality of ports to each of which each of the DKTs is connected. Further, the KSU 1 includes a time switch 3, and a central control unit 6 for controlling the entire system. The central control unit 6 has a CPU 7, a ROM 8, and a RAM 9.

On the other hand, the DKT 10 comprises a data transmitter 11, a speech transmitting/receiving circuit system 12, and a CPU 13, with further dial keys, extension telephone set selection keys, office line selection keys, etc. (all not shown).

The ADM 14 comprises a selector circuit 15, a CPU 16, normally-open contacts 35a to 35n, and a keyboard (which are all not shown). The selector circuit 15 includes AND gates 15a and 15c, an inverter circuit 15b, and an OR gate 15d. The normally-open contacts 35a to 35n are closed, respectively, when the one-touch keys arranged on the keyboard of the ADM 14, so as to correspond to these normally-open contacts 35a to 35n, are depressed, respectively. These one-touch keys access read compacted telephone dial data previously stored in the RAM 9 of the central control unit 6 of the KSU 1, for instance.

The configuration of the DKT 10 and the ADM 14 will be described hereinbelow in further detail.

The data transmitter 11 receives or transmits a packet including speech data (PCM codes) from or to the DKT interface unit 4 of the KSU 1, in accordance with the ping-pong transmission method, for instance. The data transmitter 11 outputs the speech data in the received packet to the speech transmitting/receiving circuit system 12, and the control data in the received packet to the CPU 13 and the ADM 14. Further, the data transmitter 11 receives the speech data outputted from the speech transmitting/receiving circuit system 12 and the control data outputted from the CPU 13 and the ADM 14, and transmits the packet including these data to the DKT interface unit 4.

The speech transmitting/receiving circuit system 12 includes a coded, a speech amplifier, a handset, etc., which are all not shown.

The CPU 13 receives control data from the data transmitter 11, and checks whether a data output request signal is included in the received control data. Here, the up-data output request signal is given periodically from the central control unit 6 in the KSU 1 to the DKT 10 and the ADM 14, to request the DKT 10 and the ADM 14 to output some control data. When some control data must be transmitted to the KSU 1, the CPU 13 detects the data output request signal from the control data received from the data transmitter 11, and gives a logical "H" level data transmit disable signal to one input terminal of the AND gate 15a in the selector circuit 15 of the ADM 14, an input terminal of the inverter circuit 15b, and the CPU 16. Further, the CPU 13 outputs control data in series to the other input terminal of the AND gate 15a, so that control data outputted from the CPU 13 are inputted to the data transmitter 11. On the other hand, if the CPU 13 detects the data output request signal in the control data transmitted from the data transmitter 11, in spite of the fact that it is unnecessary to transmit the control data to the KSU 1, the CPU 13 gives a logical "L" level data transmit enable signal to the other input terminal of the AND gate 15a, an input terminal of the inverter circuit 15b, and the CPU 16. Under these conditions, if any one of the normally-open contacts 35a to 35n of the ADM 14 is closed, the CPU 16 outputs the control data corresponding to the closed contact to the AND gate 15c in series, so that the control data are inputted to the data transmitter 11.

As described above, when the data output request signal is given from the KSU 1, the control data from the CPU 13 of the DKT 10 or from the CPU 16 of the ADM 14 are selectively transmitted to the KSU 1. Further, when no ADM 14 is connected to the DKT 10, the data transmitter 11 and the CPU 13 are directly connected to each other so that various control data outputted from the CPU 13 can be directly given to the data transmitter 11.

In the above-mentioned prior-art ADM 14, however, since the control data are transmitted to the KSU 1 from the CPU 13 of the DKT 10 and from the CPU 16 of the ADM 14 by selectively adjusting the selector circuit 15 composed of two AND gates, an inverter circuit, and an OR gate, there exists a problem in that the number of parts in the ADM 14 (or ADM 18) inevitably increases, and the cost thereof increases. In addition, it has been impossible to further connect another ADM other than the ADM 14 to the DKT 10, in order to further increase the functions of the DKT 10.

To overcome the above-mentioned problem, a method has been proposed such that a plurality of ADMs are connected to a plurality of ports of the DKT interface unit 4, respectively. In the DKT which adopts this method, since the DKT 10 and the plural ADMs are connected in parallel to the KSU 1, it is possible to directly control the control data transmitting timing by the central control unit 6, so that the control data outputted from the DKT 10 and plural ADMs are not superposed upon each other, without need for the above-mentioned selector circuit 15.

In the above-mentioned method, however, since the ADMs are directly connected to the ports of the DKT interface unit 4, the ports corresponding to the number of the connected ADMs are used or occupied, with the result that the number of connectable DKTs is inevitably reduced.

SUMMARY OF THE INVENTION

With these problems in mind, therefore, it is the object of the present invention to provide a key telephone system which can reduce the number of the composing elements of the ADM and markedly increase the functions of the DKT by enabling a plurality of ADMs to be connected to a single DKT, without reducing the number of the DKTs connectable to the KSU.

To achieve the above-mentioned object, the present invention provides a key telephone system provided with a key service unit having a central control unit and a key telephone set having a local control unit for communications with the central control unit, the key telephone set further including optionally connected first and second add-on modules for communication with the central control unit, wherein the key telephone set comprises first disable signal generating means for generating a first disable signal to the first add-on module, when data are transmitted from the local control unit to the central control unit; the first add-on module comprises first data transmit disabling means for disabling data from being transmitted from the first add-on module to the central control unit, when the first disable signal is received from the key telephone set, and second disable signal generating means for generating a second disable signal to the second add-on module, when the first disable signal is received from the key telephone set and when data are transmitted from the first add-on module to the central control unit; and the second add-on module comprises second data transmit disabling means for disabling data from being transmitted from the second add-on module to the central control unit, when the second disable signal is received from the first add-on module, whereby interference of data transmitted from the key telephone set, the first add-on module, and the second add-on module to the central control unit, respectively, can be prevented.

BRIEF DESCRIPTION OF THE DRAWINGS

FIG. 2A shows KSU 1 and DKT 10 connected to KSU 1, and FIG. 2B shows ADMs 24 and 34 connected to DKT 10;

FIG. 10A shows KSU 1 and DKT 10 connected to each other, and FIG. 10B shows ADMs 24 and 34 connected to DKT 110;

DETAILED DESCRIPTION OF THE PREFERRED EMBODIMENTS

An embodiment of the present invention will be described with reference to the drawings.

Figure 1:
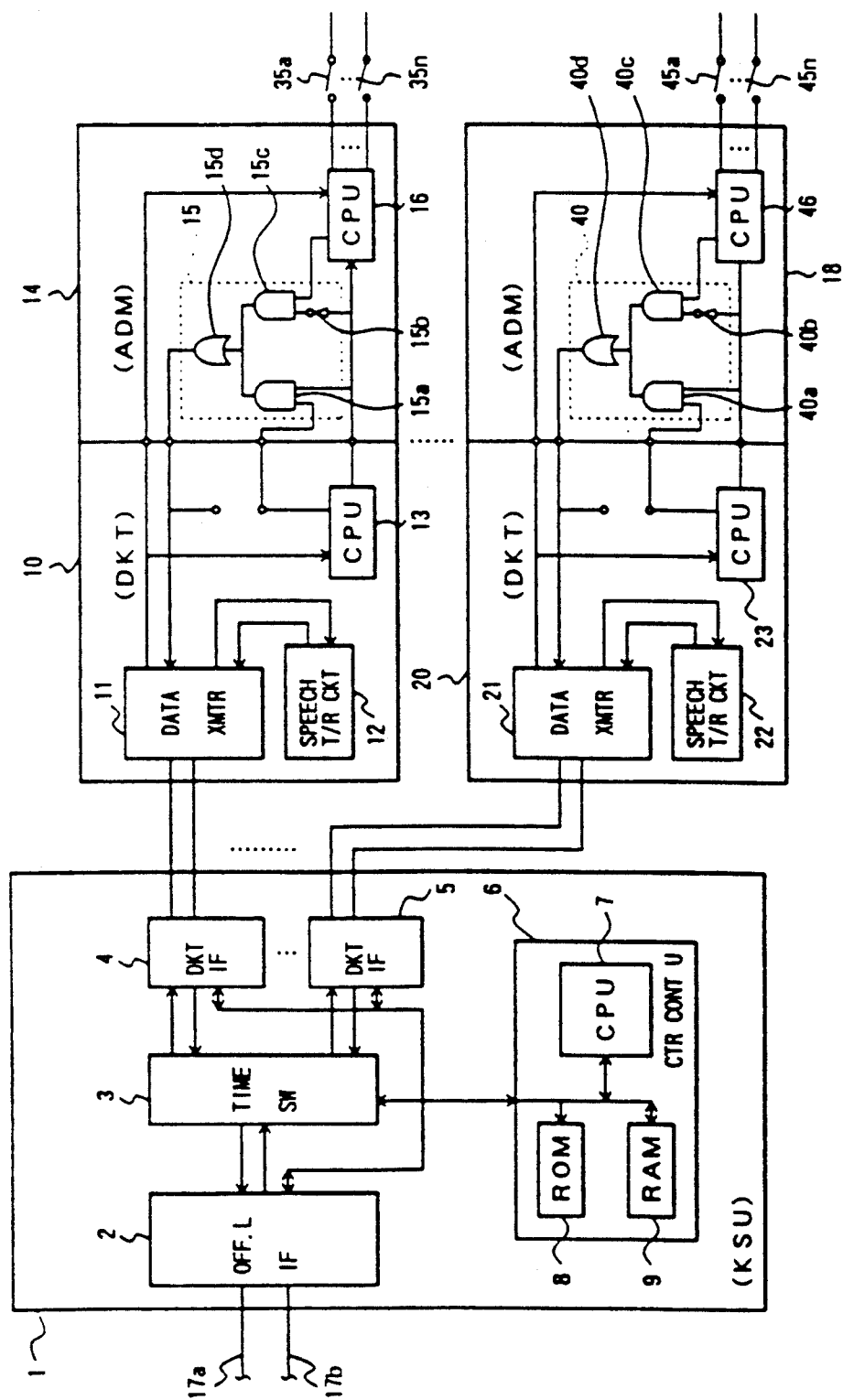
FIG. 1 is a block diagram showing the entire configuration of a prior-art key telephone system.
Figure 2:
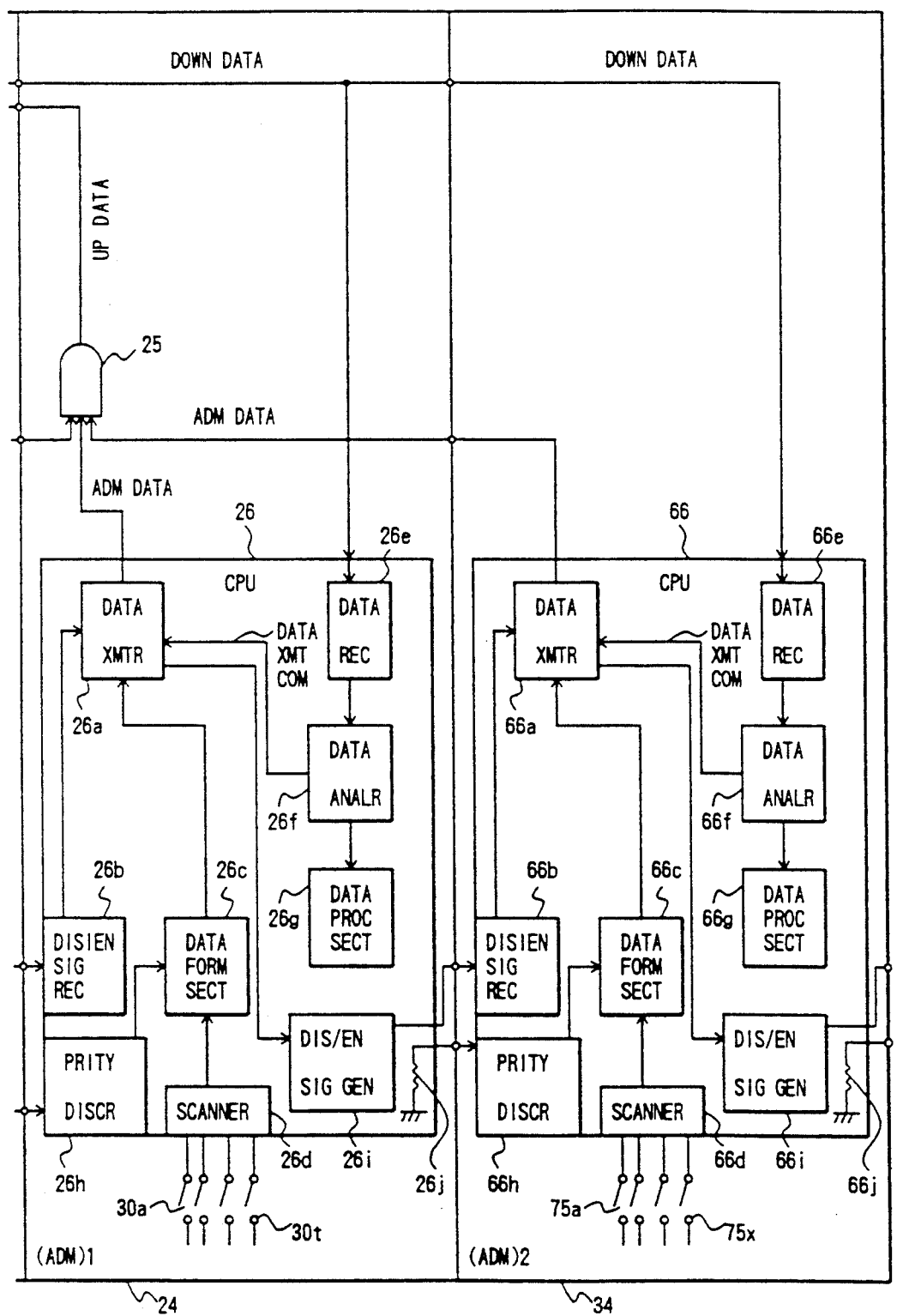
FIGS. 2A and 2B are block diagrams showing the entire configuration of an embodiment of the key telephone system according to the present invention.

FIG. 2A is a block diagram showing the entire configuration of an embodiment of the key telephone system related to the present invention. The key telephone system shown in FIG. 2A comprises a key service unit (KSU) 1, a digital key telephone set (DKT) 10 connected to the KSU 1, and two add-on modules (ADMs) 24 and 34 optionally connected to the DKT 10 for enhancement of the telephone functions (see FIG. 2(B)).

In FIGS. 2A and 2B, only one DKT and two ADMs are shown, for simplification. However, it is to be understood that a plurality of DKTs are connectable to the KSU 1, and at least two ADMs are connectable to each DKT.

In the Figures, the KSU 1 comprises an office line interface unit 2 connected to an office line 17a, 17b; a digital key telephone set (DKT) interface unit 4 connected to a DKT 10; and another similar DKT interface unit 5 connected to another DKT (not shown). The KSU 1 is provided with a plurality of similar DKT interface units (not shown) in addition to the above-mentioned two DKT interface units 4 and 5. Further, the KSU 1 comprises a time switch 3, and a central control unit 6 for controlling the system.

In more detail, the office line interface unit 2 is provided for connecting the system to the office line 17a, 17b and is provided with various functions, such as call acceptance detection, office line acquisition, call origination, conversion between analog speech signals of the office line 17a, 17b and PCM speech signals of the time switch 3, etc. An appropriate prior-art interface unit can be adopted as the office line interface unit 2. The office line interface unit 2 is controlled by the central control unit 6. That is, the office line interface unit 2 transmits and receives control signals to and from the central control unit 6. In response to the control signals from the central control unit 6, the office line interface unit 2 performs an acquisition of the office line 17a, 17b, and an origination of the call. Further, having detected a call acceptance from the office line 17a, 17b, the office line interface unit 2 transmits a control signal indicative of call acceptance to the central control unit 6.

The time switch 3 comprises a memory for storing speech data and a counter circuit, and performs time divisional conversion between the office line interface unit 2 and the interface units 4 and 5 with respect to speech data under the control of the central control unit 6. An appropriate prior-art time switch can be adopted as the time switch 3.

The DKT interface units 4 and 5 perform control data transmission between the respective DKTs and the central control unit 6, and speech data transmission between the respective DKTs and the time switch 3. Packets including control data and speech data are transmitted between the DKT interface units 4 and 5 and the respective DKTs in accordance with the ping-pong transmission method. An appropriate prior-art interface unit can be adopted as the DKT interface units 4 and 5, respectively.

The central control unit 6 comprises and a CPU 7, a ROM 8 and a RAM 9 both connected to the CPU 7.

Various control programs for the CPU 7 and fixed data are stored in the ROM 8. On the other hand, writable data, such as compacted dial data, are stored in the RAM 9.

The CPU 7 is connected to the time switch 3, the office line interface unit 2, and the DKT interface units 4 and 5, respectively, so that control data are communicatable with these units.

The CPU 7 executes various functions represented by blocks 7a to 7e in accordance with the control programs stored in the ROM 8. That is, the CPU 7 is provided with a data inputting section 7a, a data analyzer 7b, an ADM data processing section 7c, a DKT input processing section 7d, and a data transmitter 7e, all activated in accordance with the control programs.

The data inputting section 7a receives up-control-data transmitted from the interface unit 4 or 5, and inputs the received data to the data analyzer 7b. The data analyzer 7b analyzes the inputted up-control-data, and discriminates whether the up-control-data are transmitted from the office line interface unit 2, the DKT 10, the ADM 24 or the ADM 34. In accordance with the discriminated results, the control data (DKT data) from the DKT 10 are transmitted to the DKT data processing section 7d, and the control data (ADM data) from the ADM 24 or 34 are transmitted to the ADM data processing section 7c. The DKT data processing section 7d forms control data for executing various operations required in the system according to the inputted DKT data. For instance, when DKT data indicative of an extension telephone set call is inputted from the DKT 10 to another DKT, the DKT data processing section 7d forms the control data for turning on an LED lamp provided on a control panel of the DKT 10 to indicate extension telephone set speech and for generating a calling sound to another DKT called by the DKT 10. Further, when DKT data indicative of a call to an external subscriber is inputted from the DKT 10, for instance, the DKT data processing section 7d forms data for turning on an LED lamp provided on the front panel of the DKT 10 to indicate office line speech and for generating a call origination from the interface unit 2 to the office line 17a, 17b. The control data formed by the DKT data processing section 7d are given to the data transmitter 7e.

The ADM data processing section 7c forms control data for executing various operations required in the system according to the up-data (ADM data) transmitted from the ADM 24 or 34. For instance, when an ADM data indicative of depression of a one-touch key on the ADM 24 is inputted, the ADM data processing section 7c reads a compacted dial data corresponding to the one-touch key from the RAM 9 and forms a control data for allowing the office line interface unit 2 to perform a call origination in accordance with the read compacted dial data. The control data formed by the ADM data processing section 7c is given to the data transmitter 7e.

The data transmitter 7e receives control data from the DKT data processing section 7d or the ADM data processing section 7c, and transmits the received control data to the DKT interface unit 4 or 5 or the office line interface unit 2, as down-data. In addition to the above-mentioned operation, the data transmitter 7e transmits a data output request signal periodically in a predetermined order to the respective interface units 2, 4, and 5.

An appropriate prior-art unit can be adopted as the central control unit 6 to execute the above-mentioned various functions.

The DKT 10 is provided with a data transmitter 11, a speech transmitting/receiving circuit system 12, a CPU 13, and normally-open contacts 55a to 55x. In addition to the above-mentioned elements, the DKT 10 is provided with a dial key pad, an extension set selection key, an office line selection key, LEDs for displaying the selected extension set and office line, etc. (all of which are not shown) on the front panel thereof, which are all connected to the CPU 13. The extension selection key is depressed when the user of the DKT 10 wants to originate a call to an extension telephone set. The office line selection key is depressed when the user of the DKT 10 wants to originate a call to an office line. These dial keys, extension set selection keys, and office line selection key correspond to the normally-open contacts 55a to 55x, respectively.

The data transmitter 11 performs communications of packets, including PCM data and control data, with the DKT interface unit 4 of the KSU 1 in accordance with the ping-pong method under control of the CPU 13. Further, the data transmitter 11 performs communications of speech data with the speech transmitting/receiving circuit system 12, and communications of control data with the CPU 13 of the DKT 10, the CPU 26 of the ADM 24, or the CPU 66 of the ADM 34. An appropriate prior-art element can be adopted as the data transmitter 11.

The speech transmitting/receiving circuit system 12 comprises a coded, a transmitting speech amplifier, a received speech amplifier, a handset, etc. (all of which are not shown). An appropriate prior-art element can be adopted as the speech transmitting/receiving circuit system 12.

The CPU 13 executes various functions represented by the blocks denoted by numerals 13a to 13g. That is, the CPU 13 is provided with a data receiver 13a, a data analyzer 13b, a data processing section 13c, a key scanner 13d, a data forming section 13e, a disable/enable signal generator 13f, and a data transmitter 13g, which are all activated in accordance with software stored in the CPU 13.

The CPU 13 is provided with a signal source 13h for always applying a logical "H" level (positive) signal to the CPU 26 of the ADM 24. This signal source 13h serves to allow the CPU 26 of the ADM 24 to recognize that the ADM 24 has a priority over the ADM 34 with respect to the control data transmission.

The data receiver 13a receives down-control-data from the CPU 7 of the KSU 1 through the data transmitter 11, and transmits the received data to the analyzer 13b. The data analyzer 13b analyzes the inputted down-control-data. As the analyzed result, if the down-data is a control data other than the data output request signal, for instance, such as a control data for turning on or off an LED lamp or generating a calling sound, the data analyzer 13b transmits the down-data to the data processing section 13c. On the other hand, if the down-data is a data output request signal, the data analyzer 13b transmits the data transmit command to the data transmitter 13g.

The data processing section 13c activates the LED or the sounder (not shown) to display a call acceptance or generate a calling sound, for instance, according to the inputted down-data.

The normally-open contacts 55a to 55x are provided on the keyboard of the DKT 10 so as to correspond to the plural keys (all of which are not shown). When the corresponding key is depressed and therefore closed, the key scanner 13d detects the closed status of any one of the normally-open contacts 55a to 55x, and informs the data forming section 13e of the closed contact. The data forming section 13e forms a control data of a code corresponding to the closed normally-open contact, and transmits it to the data transmitter 13g.

The data transmitter 13g periodically checks whether the data transmit command is given from the data analyzer 13b. When the checked result is YES and a control data is given from the data forming section 13e, the data transmitter 13g commands the disable/enable signal generator 13f to output a disable signal to the ADM 24, and further outputs the control data (DKT data) from the data forming section 13e to an AND gate 25 of the ADM 24 in serial fashion. At this moment, since a logical "H" level dummy data ("FFH") is being outputted from the CPUs 26 and 66 of the ADMs 24 and 34 to the AND gate 25 as described later, the AND gate 25 outputs the DKT data, and the transmitted data is given to the KSU 1 through the data transmitter 11. On the other hand, when the checked result is YES and a control data is not given from the data forming section 13e, the data transmitter 13g commands the disable/enable signal generator 13 to output an enable signal to the ADM 24, and outputs an "FFH" signal (i.e. dummy data: a logical "H" level signal) to the AND gate 25 as the DKT up-data. In response to this signal, the control data (ADM data) transmitted from either of the CPU 26 of the ADM 24 or the CPU 66 of the ADM 34 is outputted from the AND gate 25, and then given to the KSU 11 through the data transmitter 11.

In response to the above-mentioned command from the data transmitter 13g, the disable/enable signal transmitter 13f outputs a disable signal or an enable signal to the CPU 26 of the ADM 24.

The signal source 13h is a pull-up resistor connected to a positive source. As already described, this signal source 13h always outputs a logical "H" level one-bit signal to the CPU 26 of the ADM 24, in order to allow the ADM 24 to recognize that the ADM 24 directly connected to the DKT 10 has a priority over another ADM 34 connected to the ADM 24 with respect to the control data transmission. This signal source 13h can be formed in various ways. For instance, the signal source 13h can be composed of a plurality of pull-up resistors connected in parallel to a positive power source so that a logical "H" level plural-bit signal can be outputted. Or else, the signal source 13h can be composed of a plurality of pull-down resistors connected in parallel to the ground so that a logical "L" level plural-bit signal can be outputted. Further, it is also possible to form the signal source 13h by use of plural pull-up and pull-down resistors so that a plural-bit signal including logical "H" and "L" level signals in combination can be outputted. Further, it is also possible to provide the signal source 13h in the DKT 10 except the CPU 13.

Figure 3:
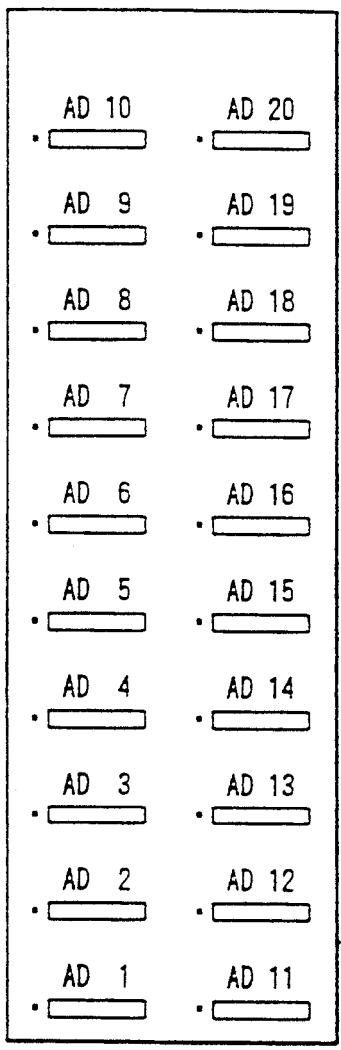
FIG. 3 is a view showing a keyboard provided for an ADM 24 shown in FIG. 2.

The ADM 24 is provided with the AND gate 25, the CPU 26, and normally-open contacts 30a to 30t. Further, the ADM 24 is provided with a keyboard 30 as shown in FIG. 3, and the respective keys correspond to the respective normally-open contacts 30a to 30t.

The CPU 26 executes various functions represented by blocks denoted by numerals 26a to 26i. In more detail, the CPU 26 comprises a data transmitter 26a, a disable/enable signal receiver 26b, a data forming section 26c, a key scanner 26d, a data receiver 26e, a data analyzer 26f, a data processing section 26g, a priority discriminator 26h, and a disable/enable signal generator 26i, which are all activated in accordance with software stored in the CPU 26.

In addition to the above-mentioned various functions, the CPU 26 further comprises a signal source 26j for always applying a logical "L" level one-bit signal to the CPU 66 of the ADM 34 connected to the ADM 24. This signal source 26j is used to allow the CPU 66 of the ADM 34 to recognize that the ADM 34 is lower than the ADM 24 with respect to the priority order of transmitting control data.

The data receiver 26a receives control data outputted from the DKT interface unit 4 of the KSU 1 through the data transmitter 11, and outputs the received data to the data analyzer 26f.

The data analyzer 26f analyzes the inputted down-data. When the analyzed data are control data other than the down-data output request signal (e.g. control data for turning on or off the LEDs provided for the respective keys of the keyboard 30, shown in FIG. 3), the data analyzer 26f transmits the analyzed down-data to the data processing section 26g. On the other hand, when the analyzed down-data is the data output request signal, the data analyzer 26f gives a data transmit command to the data transmitter 26a.

In response to the down-data transmitted from the data analyzer 26f, the data processing section 26g turns on or off the above-mentioned LEDs, for instance.

The normally-open contacts 30a to 30t are provided so as to correspond to 20 one-touch keys arranged on the keyboard as, shown in FIG. 3. Therefore, when any one of these one-touch keys is depressed, the corresponding normally-open contact is closed. These one-touch keys are used for providing access to compacted dial data previously stored into the RAM 9 of the central control unit 6 of the KSU 1. The respective one-touch keys AD 1 to AD 20 are provided with the respective LEDs (not shown) to display the respective key status. These LEDs are controlled by the CPU 26. When each of these normally-open contacts 30a to 30t is closed, this closed status is detected by the scanner 26d, and then indicated to the data forming section 26c.

The priority discriminator 26h always receives the logical "H" level one-bit signal from the signal source 13h of the above-mentioned DKT 10. Therefore, the ADM 24 recognizes a priority order over the ADM 34 with respect to the control data output. This priority order is indicated to the data forming section 26c.

In response to the closed information of the normally-open contacts transmitted from the scanner 26d, the data forming section 26c forms control data on the basis of the priority order indicated by the priority discriminator 26d and the information given by the scanner 26d, and transmits the formed data to the data transmitter 26a. This data is used to read a compacted dial data corresponding thereto from the RAM 9, as described already. Since this control data includes the priority order of the ADMs, it is possible for the KSU 1 to discriminate the ADM which outputs this control data.

In this embodiment, the ADM 24 has a first priority order and the ADM 34 has a second priority order. In this case, when the one-touch key AD 1 of the ADM 24 shown in FIG. 3 is depressed, the data forming section 26c of the ADM 24 forms a control data indicative of compacted dial No. 1. In contrast, in the case where the ADM 34 has a first priority order and the ADM 24 has a second priority order, when the one-touch key AD 1 of the ADM 24 is depressed, the data forming section 26c forms a control data indicative of compacted dial No. 21. As described above, when the predetermined priority order is different, a different code data can be formed for the same ADM even if the same key is depressed. In other words, it is possible to freely determine the priority order of the ADMs 24 and 34.

The data receiver 26b receives a disable or enable signal outputted from the disable/enable signal generator 13f of the DKT 10, and transmits the received signal to the data transmitter 26a.

The data transmitter 26a periodically checks whether the above-mentioned data transmit command is given from the data analyzer 26f. When the periodic check result is YES, the data transmitter 26a checks whether control data are inputted from the data forming section 26c. When the checked result is YES, the data transmitter 26a checks whether the disable or enable signal is inputted from the disable/enable signal receiver 26b. When the enable signal is inputted, the data transmitter 26a outputs the control data (ADM data) to the AND gate 25 in serial fashion, and further commands the disable/enable signal generator 26i to output the disable signal to the ADM 34. In this case, the CPU 13 of the DKT 10 outputs a logical "H" level dummy data ("FFH") to the AND gate 25, as described already. Further, in response to the disable signal from the ADM 24, the CPU 66 of the ADM 34 outputs a logical "H" level dummy data ("FFH"). Therefore, the control data outputted from the CPU 26 of the ADM 24 is inputted to the data transmitter 11 through the AND gate 25, and then transmitted to the KSU 1.

On the other hand, when the disable signal is inputted from the disable/enable signal receiver 26b, the data transmitter 26a outputs a logical "H" level dummy data ("FFH") to the AND gate 25, irrespective of whether the control data is inputted from the data forming section 26c or not, and further commands the disable/enable signal generator 26i to output the disable signal.

In accordance with the command from the data transmitter 26a, the disable/enable signal generator 26i outputs the disable signal or enable signal to the CPU 66 of the ADM 34.

The signal source 26j is formed of a pull-down resistor connected to the ground, and always outputs a logical "L" level one-bit signal to the CPU 66 of the ACM 34.

The AND gate 25 receives control data outputted from the DKT 10, the ADM 24, and the ADM 34, respectively. As already described, when any one of the DKT 10, ADM 24, and ADM 34 is outputting a significant control data, since the remaining two are outputting a dummy data "FFH", respectively, the control data are inputted to the data transmitter 11 through the AND gate 25, and then transmitted to the KSU 1.

Figure 4:
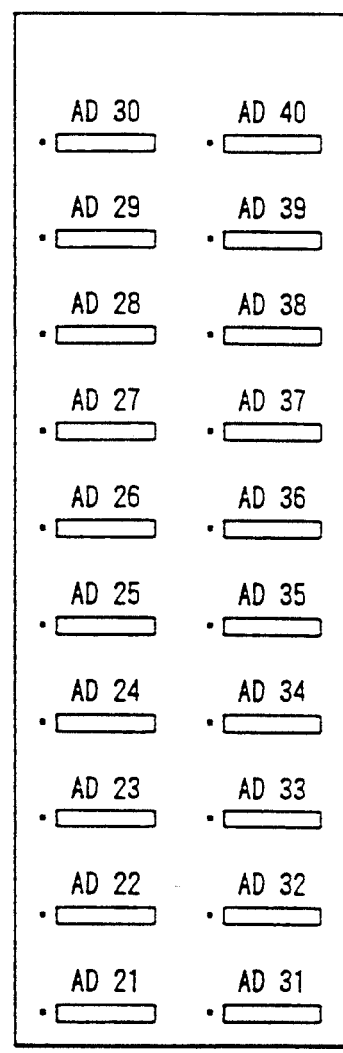
FIG. 4 is a view showing a keyboard provided for an ADM 34 shown in FIG. 2.

The ADM 34 connected to the ADM 24 is provided with the CPU 66, normally-open contacts 75a to 75x, and a keyboard 75 as shown in FIG. 4. The keyboard 75 includes one-touch keys AD 21 to AD 31 so as to correspond to the normally-open contacts 75a to 75x, respectively. Further, the CPU 66 comprises various functions represented by blocks denoted by numerals 66a to 66j. The functions of the CPU 66 are the same as with the case of the CPU 26 already explained. That is, the ADM 34 is the same as the ADM 24 in configuration except the AND gate 25. The output of the data transmitter 66a of the CPU 66 is connected to the AND gate 25 of the ADM 24. The input of the disable/enable signal receiver 66b is connected to the output of the disable/enable signal generator 26i of the ADM 24. The input of the priority discriminator 66h is connected to the signal source 26j of the ADM 24. The input of the data receiver 66e is connected to the data transmitter 11 of the DKT 10 through the ADM 24.

In this embodiment, no ADM having a priority order lower than that of the ADM 34 with respect to the control data output is connected to the ADM 34. Therefore, it is possible to remove the disable/enable signal generator 66i and the signal source 66j within the CPU 66.

The transmission and reception of control data between the above-mentioned KSU 1 and the above-mentioned DKT 10, ADM 24, ADM 34 will be described hereinbelow with reference to a timing chart shown in FIGS. 5 and 6, a flowchart for explaining the processing by the CPU 13 shown in FIG. 7, a flowchart for explaining the processing by the CPU 26 and the CPU 66 shown in FIG. 8, and a diagram for assistance in explaining the operation of the key telephone system of the present invention shown in FIG. 9.

When control data (e.g. data output request signal) is outputted from the central control unit 6 of the KSU 1 to the DKT 10, the outputted data output request signal is formed into one-frame serial data together with PCM data from the time switch 3 through the DKT interface unit 4 as shown in FIG. 5(a), and the formed one-frame data are transmitted to the data transmitter 11 of the DKT 10. The one-frame data are separated to speech data and control data (data output request signal) by the data transmitter 11. The separated data output request signal is transmitted to the CPU 13 of the DKT 10, the CPU 26 of the ADM 24, the CPU 66 of the ADM 34, respectively.

Figure 7:
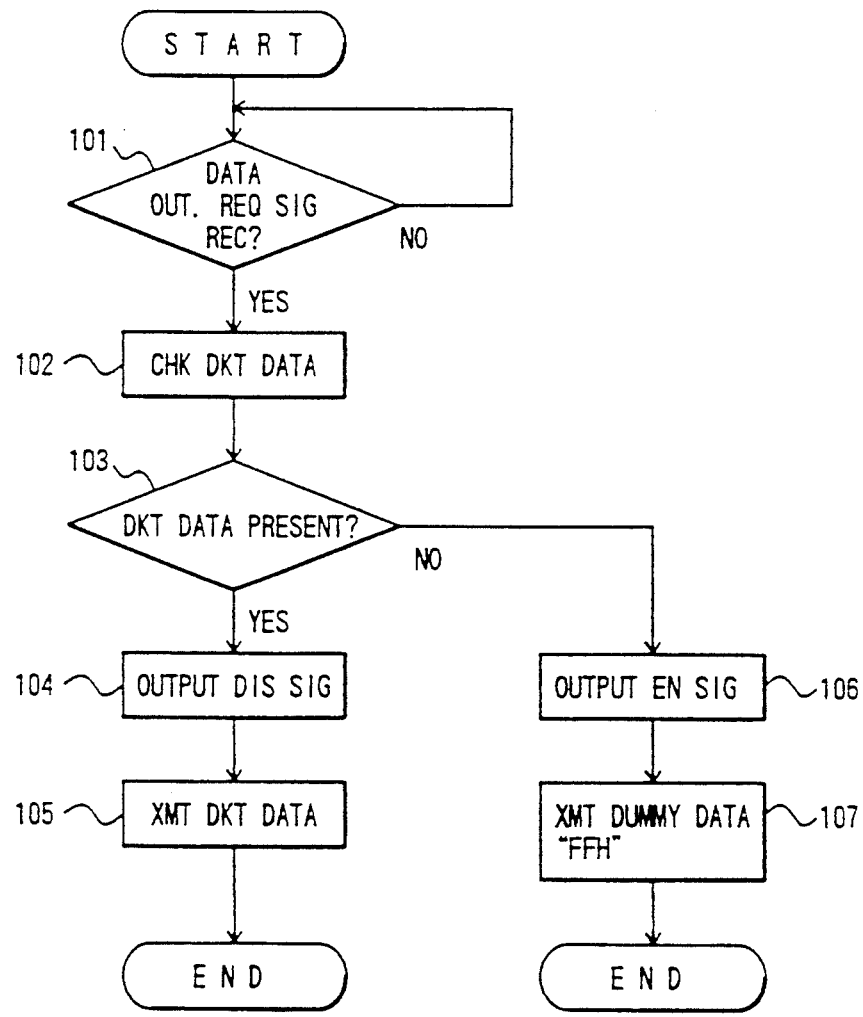
FIG. 7 is a flowchart for explaining the control operation of the CPU 13 in the DKT 10 shown in FIG. 2.

In response to the data output request signal (at the time t₁ in FIG. 5 and in step 101 in FIG. 7), the CPU 13 of the DKT 10 checks the presence or absence of the control data (DKT data) to be transmitted to the KSU 1 (in step 102 in FIG. 7). If YES (in step 103 in FIG. 7), the CPU 13 outputs the disable signal to the CPU 26 of the ADM 24 (in FIG. 5(c) and in step 104 in FIG. 7). In response to the disable signal, the CPU 26 of the ADM 24 also outputs the disable signal to the CPU 66 of the ADM 34 (in FIG. 5(d) and in steps 112, 113, and 119 in FIG. 8). Subsequently, the CPU 13 outputs the control data (DKT data)(in FIG. 5(b) and in step 105 in FIG. 7), and further the CPUs 26 and 66 output the dummy data "FFH" (in FIGS. 5(e) and (f) and in step 120 in FIG. 8). As the result, the DKT data is transmitted to the KSU 1. If the DKT data is absent when the CPU 13 of the DKT 10 checks the presence or absence of the DKT data in response to the data request signal from the KSU 1 (at the time t₂, in FIG. 5), the CPU 13 outputs the enable signal to the CPU 26 of the ADM 24 (in FIG. 5(c) and in step 106 in FIG. 7). In response to the enable signal, the CPU 26 of the ADM 24 checks the presence or absence of the control data (ADM data) to be transmitted to the KSU 1, and outputs the disable signal to the CPU 66 of the ADM 34 if the ADM data is present (in FIG. 5(d) and in steps 114, 115, and 116 in FIG. 8). Subsequently, the CPU 13 outputs the dummy data "FFH" (in FIG. 5(b) and in step 107 in FIG. 7); the CPU 24 outputs the ADM data (in FIG. 5(e) and in step 117 in FIG. 8); and the CPU 66 outputs the dummy signal (in FIG. 5(f) and in step 120 in FIG. 8). Therefore, the ADM data outputted from the ADM 24 is transmitted to the KSU 1.

Figure 5:
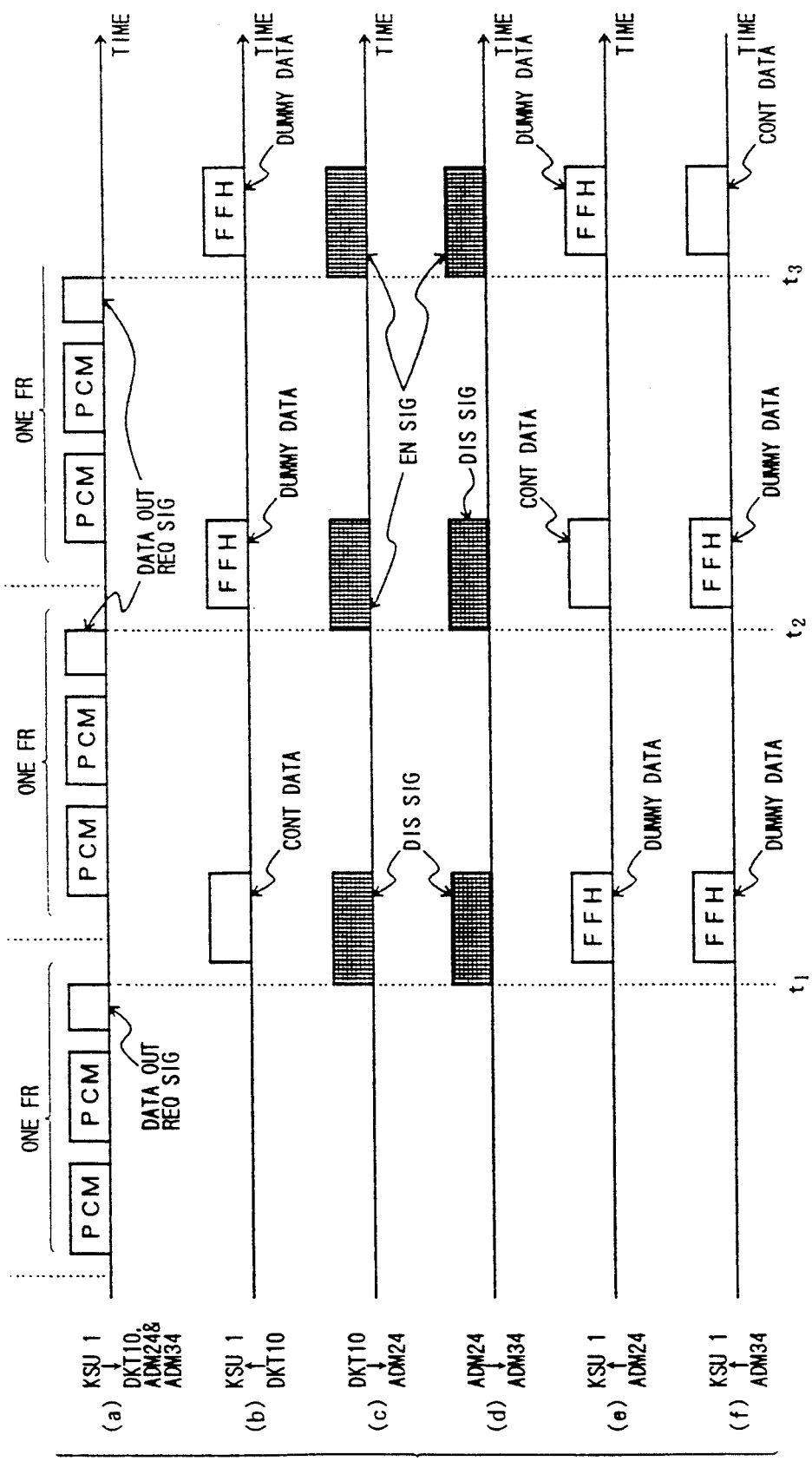
FIG. 5 is a timing chart for in explaining data reception and transmission operation among the KSU 1, DKT 10, ADM 24, and ADM 34 shown in FIG. 2.
Figure 8:
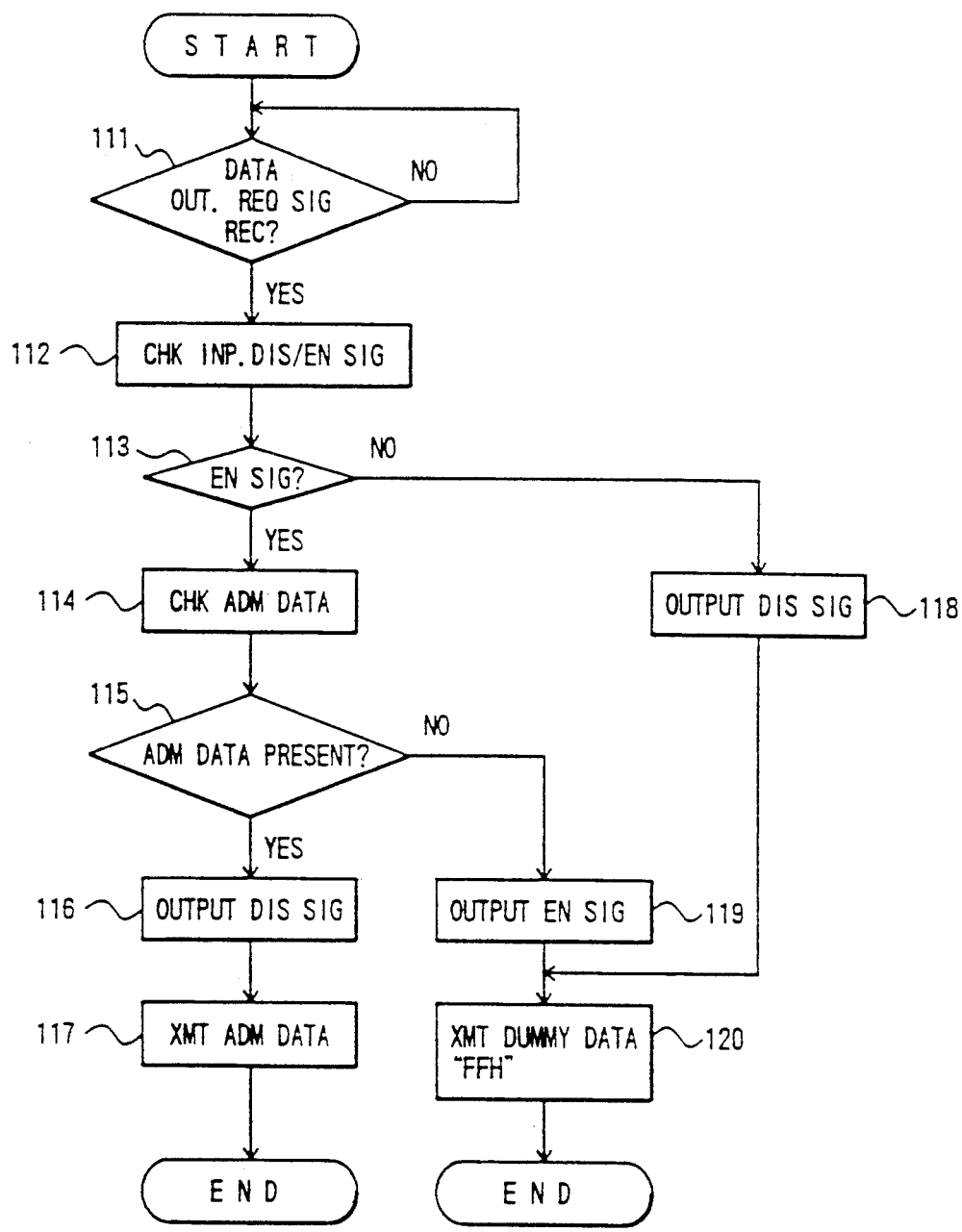
FIG. 8 is a flowchart for explaining the control operation of the CPUs 26 and 66 in the ADMs 24 and 34 shown in FIG. 2.
Figure 9:
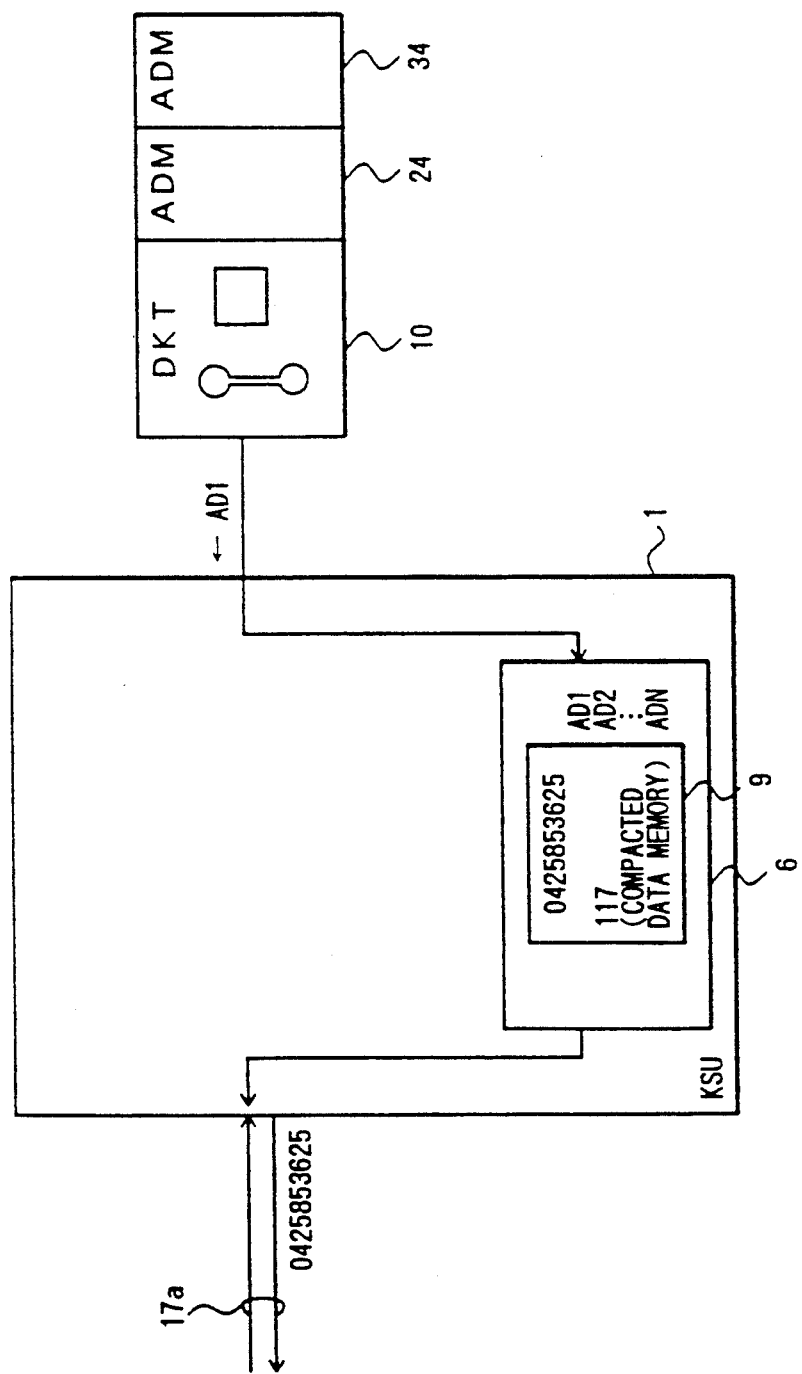
FIG. 9 is an illustration for explaining the operation of the system shown in FIG. 2.

When the DKT 10 and ADM 24 have both no control data to be transmitted to the KSU 1 in response to the data output request signal from the KSU 1 (at the time $t_3$ in FIG. 5), the CPU 26 of the ADM 24 gives the enable signal to the CPU 66 of the ADM 34 (in FIG. 5(d) and in step 119 in FIG. 8). In response to this enable signal, the CPU 66 of the ADM 34 checks the presence and absence of its own ADM data, and outputs the ADM data if present (in FIG. 5(f) and in step 117 in FIG. 8). At this moment, the CPU 13 and the CPU 26 both output the dummy signal "FFH", respectively. Therefore, the ADM data transmitted from the ADM 34 is given to the KSU 1.

Figure 6:
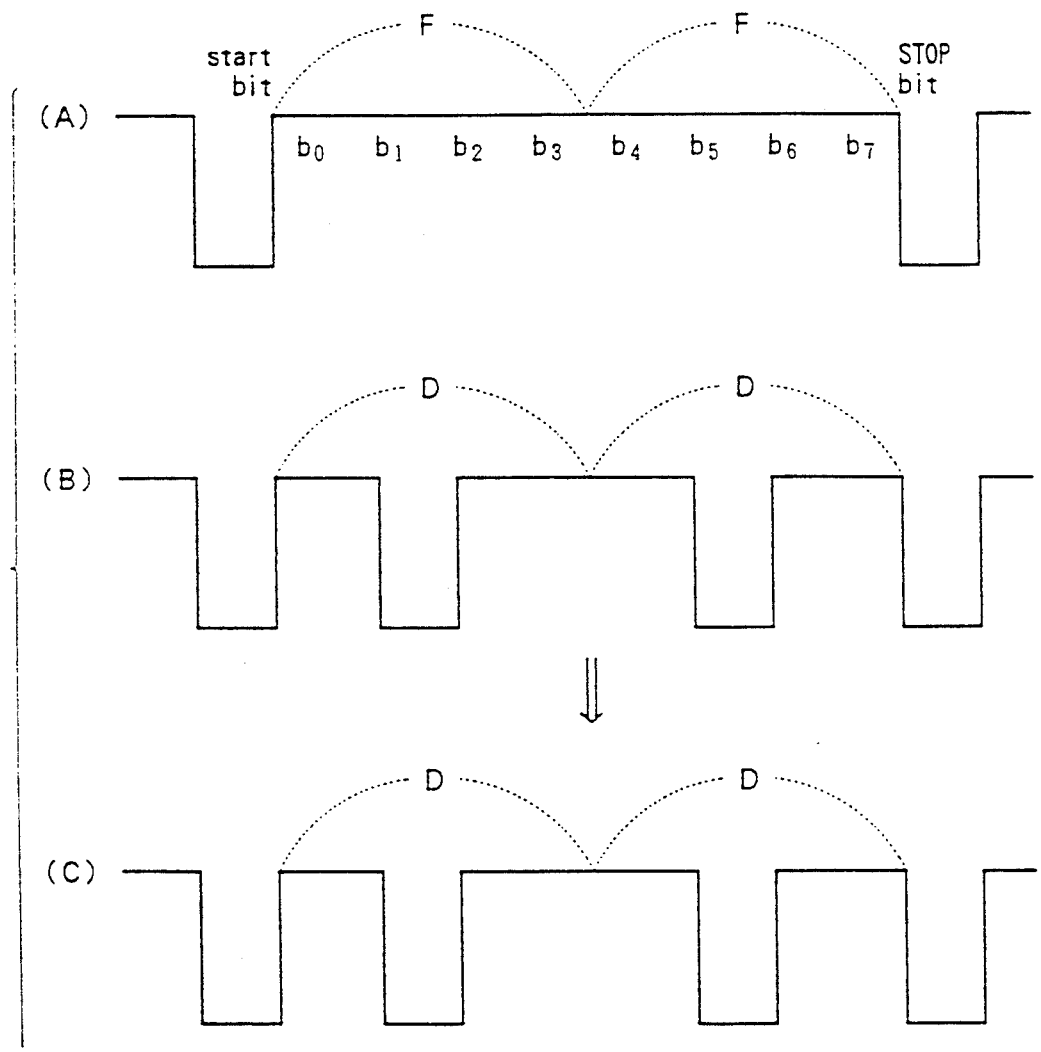
FIG. 6 is a timing chart showing data inputted to and outputted from the AND gate 25 shown in FIG. 2.

FIG. 6 is a timing chart for assistance in explaining the logical product by the AND gate 25 in the ADM 24, when the DKT 10 gives the enable signal to the ADM 24; the ADM 24 gives the disable signal to the ADM 34; and the CPU 26 of the ADM 24 outputs its own ADM data. Further, FIG. 5(A) shows the dummy data outputted from the DKT 10. This dummy data is composed of a logical "L" level start bit, a logical "L" level stop bit, and logical "H" level 8-bits ($b_0$, $b_1$, $b_2$, $b_3$, $b_4$, $b_5$, $b_6$, $b_7$) arranged between the start bit and the stop bit. The CPU 66 of the ADM 34 outputs the same dummy data as described above. FIG. 6(B) shows the ADM data outputted from the CPU 26 of the ADM 24. This ADM data is composed of a logical "L" level start bit, a logical "L" level stop bit, logical "L" level bits $b_1$ and $b_5$, and logical "H" level bits $b_0$, $b_2$, $b_3$, $b_4$, $b_6$ and $b_7$. FIG. 6(C) shows the data outputted from the AND gate 25 which is the ANDed result of the dummy data shown in FIG. 6(A) and the ADM data shown in FIG. 6(B). The output data of the AND gate 25 as shown in FIG. 6(C) is the same as the ADM data outputted from the CPU 26 of the ADM 24. The ADM data outputted from the AND gate 25 is transmitted to the central control unit 6 of the KSU 1. In response to this ADM data, the CPU 7 in the central control unit 6 reads a compacted dial data corresponding to the ADM data from the RAM 9. This read compacted dial data is transmitted to the office line interface unit 2. Therefore, the office line interface unit 2 transmits a call based upon the read compacted dial data, as shown in FIG. 9.

Figure 10:
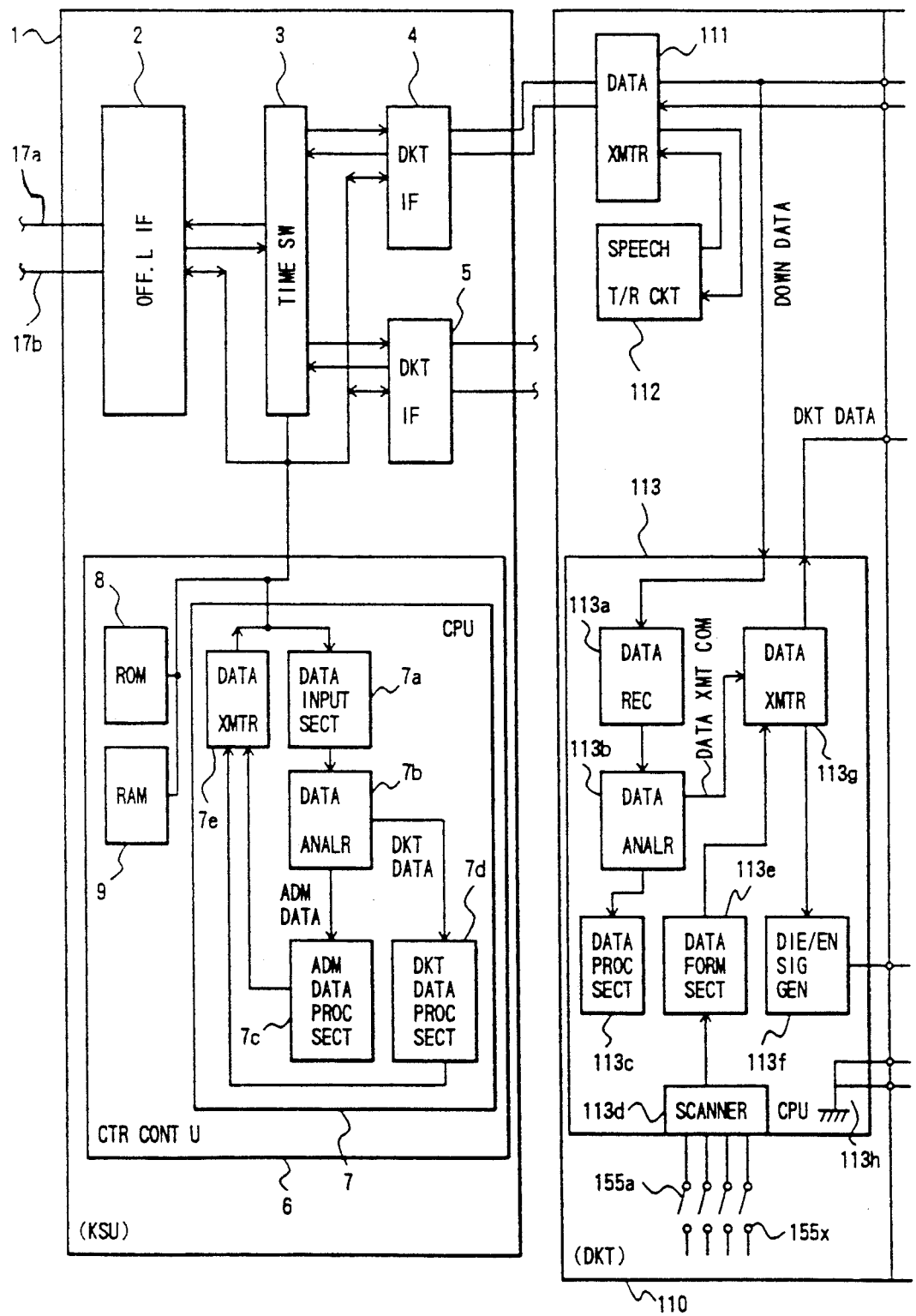
FIGS. 10A and 10B are block diagrams showing the entire configuration of another embodiment according to the present invention.

FIG. 10 shows the entire configuration of another embodiment of the present invention. The components different from the afore-mentioned embodiment will now be described. Those not described are the same in function as those of the preceding embodiment.

A CPU 113 of a DKT 110 is provided with a signal source 113h for applying a logical "L" level two-bit priority signal to a CPU 126 of an ADM 124. This signal source 113h is used to allow the CPU 126 of the ADM 124 to recognize that the ADM 124 has a priority order over the ADM 134 with respect to the output of control data.

Figure 11:
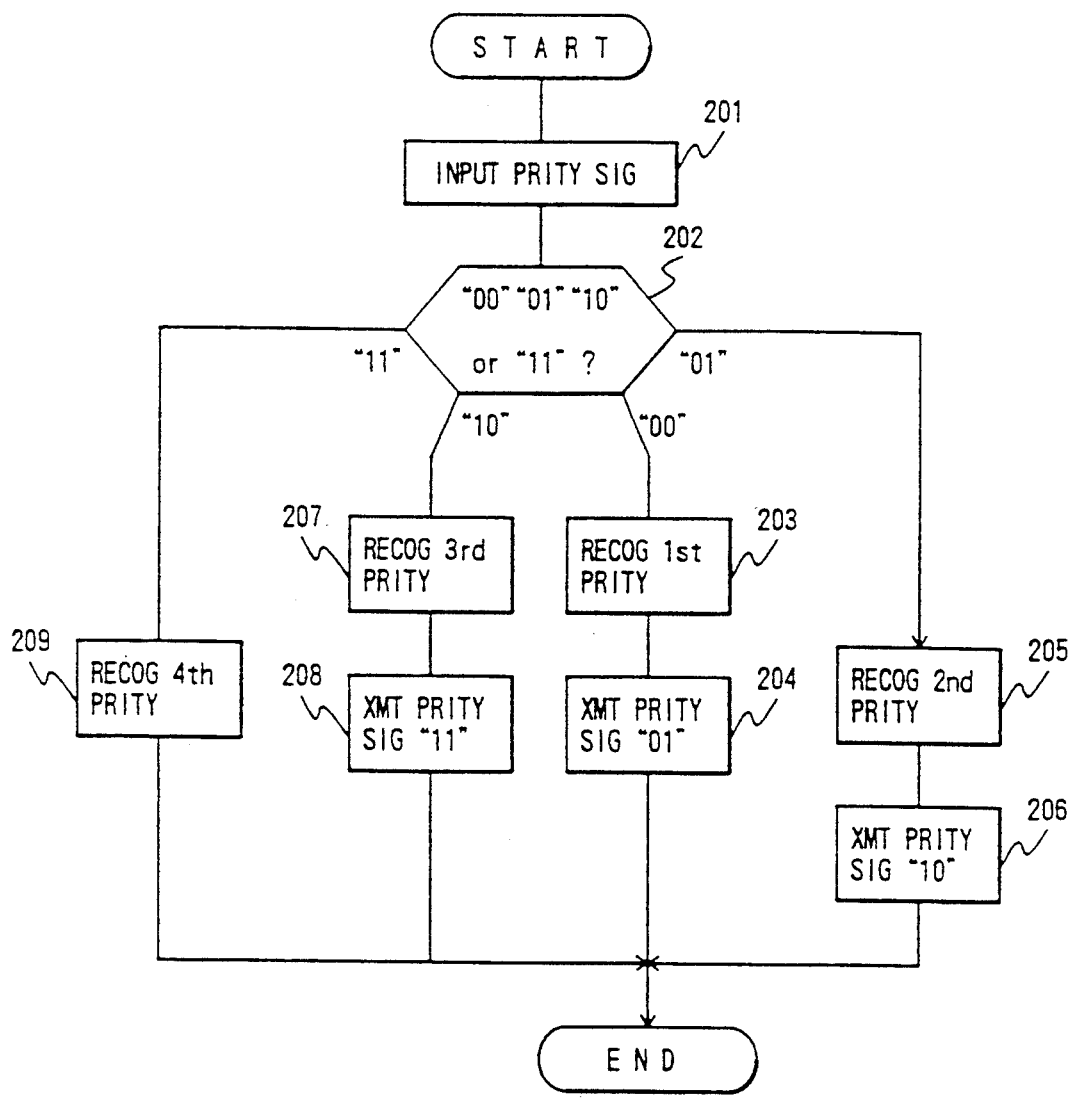
FIG. 11 is a flowchart for explaining the processing for allowing the CPUS 126 and 166 of the ADMs 124 and 134 shown in FIG. 10 to recognize the priority orders, respectively.

The priority discriminator 126h of the CPU 126 of the ADM 124 always receives a two-bit priority signal "00" from the signal source of the DKT 110, and recognizes the priority order given to its own ADM 124 with respect to the control data output, in accordance with the flowchart shown in FIG. 11. In more detail, since the inputted priority signal is "00" (in steps 201 and 202), the first priority order given to the ADM 124 is recognized as the first priority order (in step 203). The recognized first priority order is transmitted to a data forming section 126c and a priority signal outputting section 126j. In response to this transmitted signal, the priority signal outputting section 126j transmits a two-bit priority signal "01" to a priority discriminator 166h of a CPU 166 of the succeeding ADM 134 (in step 204).

In response to the priority order signal of "10" transmitted from the ADM 124, the priority discriminator 166h of the ADM 134 recognizes the priority order of its own ADM 134 in accordance with the flowchart as shown in FIG. 11. In more detail, since the inputted priority signal is "01" (in steps 201 and 202), the second priority order is recognized (in step 205). The recognized second priority order is transmitted to a priority signal outputting section 166j. In response to this signal, the priority signal outputting section 166j outputs a priority signal of "10" (in step 206).

When another ADM is connected to the ADM 134, the ADM recognizes that its own priority order is the third on the basis of the priority signal of "10" transmitted from the ADM 134, and further outputs a priority signal of "11" for the succeeding stage ADM (in steps 207 and 208 in FIG. 11). Similarly, a further succeeding ADM can recognize its own fourth priority order on the priority order signal of "11" (in step 207).

In this embodiment, it is possible to connect four ADMs to the DKT at the maximum on the basis of the two-bit priority signal. However, it is possible to connect still more ADMs to the DKT by use of a three or more bit priority signal. Further, in this embodiment, although the priority signal is formed in accordance with the software within the CPU, it is, of course, possible to generate the priority signal by use of hardware connected to the CPU.

The same description of the operation as with the case of the afore-mentioned embodiment can be applied to this embodiment with respect to the control data transmission of the DKT 110, ADM 124, and ADM 134.

Figure 12:
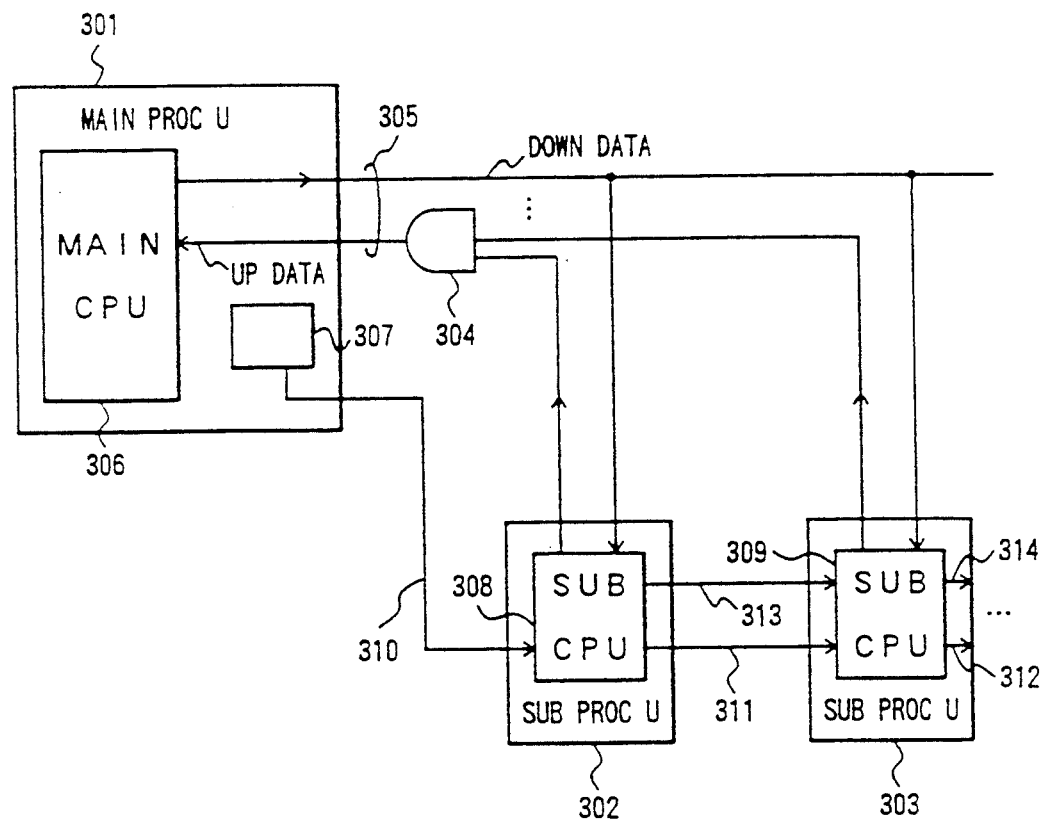
FIG. 12 is a block diagram showing the entire configuration of still another embodiment according to the present invention.

FIG. 12 shows still another configuration of a more general embodiment of the present invention.

In FIG. 12, a plurality of sub-processing units 302, and 303 are connected to a main processing unit 301 through a communication line or path 305. Up-data outputted from the sub-processing units 302 and 303 to the main processing unit 301 are transmitted to the path 305 through an AND gate 304.

The main processing unit 301 comprises a main CPU 306 for receiving the up-data and transmitting down-data. The sub-processing units 302 and 303 comprise sub-CPUs 308 and 309 for receiving the down-data and transmitting the up-data, respectively.

The main processing unit 301 includes a priority signal source 307 for transmitting a priority signal 310 indicative of the priority order of the sub-processing unit 302 to the sub-CPU 308 of the first stage sub-processing unit 302. In response to this priority signal 310, the CPU 308 recognizes its own priority order, and further transmits another priority signal 311 indicative of the priority order of the succeeding stage sub-processing unit 303. In response to this priority signal 311, the sub-CPU 309 gives still another priority signal 312 indicative of the priority order of still another succeeding stage sub-processing unit (not shown). As described above, the priority orders are given to a plurality of sub-processing units 302 and 303 in such a way that the latter the sub-processing unit is, the lower will be the priority order.

When outputting the up-data, the CPU 308 of the first sub-processing unit 302 outputs a data output disable signal to the CPU 309 of the succeeding stage sub-processing unit 303. When receiving a data output disable signal 313 from the CPU 308 or when transmitting its own up-data, the CPU 309 of the sub-processing unit 303 gives the data output disable signal 314 to still another succeeding stage sub-processing unit (not shown). As described above, in response to the data output disable signal 313 or 314, the second stage and after sub-processing units can recognize that the sub-processing unit having a priority order higher than its own priority order outputs data, while outputting a logical "H" level dummy signal to the AND gate 304. Accordingly, a plurality of sub-processing units 302 and 303 can output up-data at different timings in accordance with the given priority orders, thus preventing the up-data interference with each other.

The configuration shown in FIG. 12 can be applied to various information processing systems. For instance, this can be applied to communications between the central processing unit and a plurality of interface units within the KSU of the key telephone system. In this case, the main processing unit 301 shown in FIG. 12 corresponds to the central processing unit of the KSU, and the sub-processing units 302 and 303 correspond to the interface units within the KSU.

What is claimed is:

1. A key telephone system provided with a key service unit having a central control unit and a key telephone set having a local control unit for communications with the central control unit, the key telephone set further including optionally connected first and second add-on modules for communications with the central control unit, wherein:

the key telephone set comprises first disable signal generating means for generating a first disable signal to the first add-on module, when data are transmitted from the local control unit to the central control unit;

the first add-on module comprises first data transmit disabling means for disabling data from being transmitted from the first add-on module to the central control unit, when the first disable signal is received from the key telephone set; and second disable signal generating means for generating a second disable signal to the second add-on module, when the first disable signal is received from the key telephone set and when data are transmitted from the first add-on module to the central control unit; and the second add-on module comprises second data transmit disabling means for disabling data from being transmitted from the second add-on module to the central control unit, when the second disable signal is received from the first add-on module, whereby interference of data transmitted from the key telephone set, the first add-on module, and the second add-on module to the central control unit, respectively can be prevented.

2. The key telephone system of claim 1, wherein:

the key telephone set comprises first priority signal generating means for generating a first priority signal to the first add-on module;

the first add-on module comprises first data transmitting means for transmitting priority order information represented by the first priority signal and data transmitted from the first add-on module to the central control unit together, and second priority signal generating means for generating a second priority signal to the second add-on module; and the second add-on module comprises second data transmitting means for transmitting priority order information represented by the second priority signal and data transmitted from the second add-on module to the central control unit together, whereby the central control unit can recognize whether the data are transmitted from the first add-on module or the second add-on module.

3. The key telephone system of claim 2, wherein the first and second priority signals are predetermined digital coded signals different from each other.

4. The key telephone system of claim 2, wherein the first priority signal is a previously determined digital coded signal, and the second priority signal a digital coded signal different from the first priority signal and formed by said second priority signal generating means according to the code of the first priority signal.

5. The key telephone system of claim 1, which further comprises logical gate means for receiving data transmitted from the key telephone set, the first add-on module, and the second add-on module, respectively to transmit only data passed through said logical gate means to the central control unit, and wherein:

said first data transmitting means transmits dummy data to said logical gate means when the first disable signal is received, so that data transmitted from the key telephone set can be passed through said logical gate means; and said second data transmitting means transmits dummy data to said logical gate means when the second disable signal is received, so that data transmitted from the key telephone set or the first add-on module can be passed through said logical gate means.

6. The key telephone system of claim 1, wherein:

said first disable signal generating means generates a first enable signal to the first add-on module, at a selected time period when data are not transmitted from the local control unit to the central control unit;

said second disable signal generating means generates a second enable signal to the second add-on module, when the first enable signal is received and data to be transmitted from the first add-on module to the central control unit are absent;

said first data transmitting means transmits data to the central control unit, when the first enable signal is received and data to be transmitted from the first add-on module to the central control unit are present; and said second data transmitting means transmits data to the central control units, when the second enable signal is received and data to be transmitted from the second add-on module the central control unit are present.

7. The key telephone system of claim 6, which further comprises logical gate means for receiving data transmitted from the key telephone set, the first add-on module, and the second add-on module, respectively to transmit only data passed through said logical gate means to the central control unit, and wherein:

the local control unit transmits dummy data to said logical gate means when the first enable signal is outputted, so that data transmitted from the first and second add-on modules can pass through said logical gate means;

said first data transmitting means transmits dummy data to said logical gate means when the first disable signal is received and when the second enable signal is outputted, so that data transmitted from the key telephone set or the second add-on module can pass through said logical gate means; and said second data transmitting means transmits dummy data to said logical gate means when the second disable signal is received, so that data transmitted from the key telephone set or the first add-on module can pass through said logical gate means.

8. A communications system between units provided with a main processing unit and a plurality of sub-processing units communicatably connected to the main processing unit, which comprises:

priority signal generating means for generating priority signals to the plural sub-processing units to determine different priority orders to the sub-processing units, respectively; and wherein each of the plural sub-processing units comprises:

means for receiving a disable signal from another sub-processing unit having another adjacent priority order higher than its own priority order;

means for disabling data from being transmitted from its own unit to the main processing unit, when a disable signal is received from the other sub-processing unit; and means for transmitting a disable signal to another sub-processing unit having another adjacent priority order lower than its own priority order, when a disable signal is received from the other sub-processing unit and when data are transmitted from its own unit to the main processing unit.

9. The communications system of claim 8, wherein said priority signal generating means includes means provided for each sub-processing unit, for outputting priority signals indicative of priority orders different from its own priority order to other sub-processing units.

* * * * *